(12) United States Patent
Baumann et al.

(10) Patent No.: US 8,915,696 B2
(45) Date of Patent: Dec. 23, 2014

(54) DEVICE AND METHOD FOR DEPALLETIZING STACKED BUNDLES

(75) Inventors: Michael Baumann, Unterföhring (DE); Herbert Fellner, Kobermoor (DE)

(73) Assignee: Kuka Roboter GmbH, Augsburg (DE)

( * ) Notice: Subject to any disclaimer, the term of this patent is extended or adjusted under 35 U.S.C. 154(b) by 1495 days.

(21) Appl. No.: 12/298,678

(22) PCT Filed: May 8, 2007

(86) PCT No.: PCT/EP2007/004052
§ 371 (c)(1),
(2), (4) Date: Oct. 27, 2008

(87) PCT Pub. No.: WO2007/131668
PCT Pub. Date: Nov. 22, 2007

(65) Prior Publication Data
US 2009/0148266 A1 Jun. 11, 2009

(30) Foreign Application Priority Data
May 12, 2006 (DE) .......................... 10 2006 022 155

(51) Int. Cl.
*B65G 59/02* (2006.01)
*B66C 1/02* (2006.01)
*B65G 59/04* (2006.01)

(52) U.S. Cl.
CPC ................ *B65G 59/04* (2013.01); *B65G 59/02* (2013.01); *B65G 59/023* (2013.01); *B66C 1/0218* (2013.01); *Y10S 414/12* (2013.01)
USPC ..................... 414/796.2; 414/796.6; 414/907; 414/623

(58) Field of Classification Search
USPC ............ 198/512; 271/268, 81; 414/528–529, 414/531, 535, 622–623, 791.6, 792.6, 414/792.8, 793.4–793.5, 794.2–794.3, 414/795.9, 796, 796.2–796.3, 796.5, 796.7, 414/796.9, 797.2–797.3, 907
See application file for complete search history.

(56) References Cited

U.S. PATENT DOCUMENTS

| | | | | |
|---|---|---|---|---|
| 3,070,241 A | * | 12/1962 | Johnston ..................... | 414/796.7 |
| 3,263,829 A | * | 8/1966 | Derricott et al. .......... | 414/796.7 |
| 3,749,257 A | * | 7/1973 | Yamashita ................. | 414/796.7 |
| 4,453,874 A | | 6/1984 | Veldhuizen et al. | |
| 4,592,692 A | | 6/1986 | Suiza et al. | |
| 4,911,608 A | | 3/1990 | Krappitz et al. | |
| 5,051,058 A | * | 9/1991 | Roth ........................... | 414/789.1 |
| 5,082,319 A | * | 1/1992 | Hurliman et al. .......... | 294/119.1 |
| 5,088,783 A | * | 2/1992 | Squires ....................... | 294/81.54 |
| 5,265,712 A | | 11/1993 | Krieg | |
| 5,524,747 A | * | 6/1996 | Wohlfahrt et al. ............ | 198/512 |
| 5,868,549 A | * | 2/1999 | Lee et al. .................... | 414/791.6 |

(Continued)

FOREIGN PATENT DOCUMENTS

| | | | | |
|---|---|---|---|---|
| DE | 4317283 C1 | * | 9/1994 | ............... B25J 15/00 |
| EP | 257447 A2 | * | 3/1988 | ............. B65G 27/24 |

(Continued)

*Primary Examiner* — Gregory Adams
(74) *Attorney, Agent, or Firm* — Schiff Hardin LLP

(57) ABSTRACT

In a method and device for depalletizing stack containers, the stacked containers are supported by at least one support base, and the stacked containers on the support base are frictionally engaged and lifted on two opposite sides thereof.

25 Claims, 10 Drawing Sheets

(56) References Cited

U.S. PATENT DOCUMENTS

| | | | |
|---|---|---|---|
| 6,164,900 A * | 12/2000 | Labell et al. | 414/792.1 |
| 7,682,125 B2 * | 3/2010 | Binder et al. | 414/797.2 |
| 2002/0028130 A1 * | 3/2002 | Naldi | 414/796.5 |
| 2002/0154986 A1 | 10/2002 | Leblanc et al. | |
| 2005/0265817 A1 * | 12/2005 | Blanc | 414/799 |

FOREIGN PATENT DOCUMENTS

| | | | | |
|---|---|---|---|---|
| FR | 2 754 803 | | 4/1998 | |
| GB | 2066201 A | * | 7/1981 | ............. B65G 57/06 |
| WO | WO 2005051812 A1 | * | 6/2005 | ............. B65G 47/90 |
| WO | WO 2006000847 A2 | * | 1/2006 | ............. B65G 57/06 |

* cited by examiner

DEVICE AND METHOD FOR DEPALLETIZING STACKED BUNDLES

BACKGROUND OF THE INVENTION

1. Field of the Invention

The present invention concerns a method for depalletizing stacked containers, of the type wherein containers are lifted in a frictionally engaged manner and are underridden by at least one support base, as well as a device for depalletizing stacked containers, with at least one roller to lift the containers and with a support base.

The invention in particular concerns the depalletizing of containers stacked on a pallet

2. Description of the Prior Art

Individual goods or connected goods containers are typically stacked in multiple layers on a palette and are arranged there for a transport. Given homogeneous palletizing, identical goods (such as beverage containers, for example) are stacked on the pallet. Given mixed palletizing, different goods or goods containers are arranged on a single palette. This is also called mixed commissioning. A wide-spread application is the arrangement of a mixed pallet of goods based on an order of a retailer with a distributor. The goods ordered by retailer are assembled from a storage of the distributor. The desired goods are thereby removed from homogeneous pallets and individually assembled on a delivery pallet according to the customer order. The mixed, commissioned pallet is then delivered to the buyer, i.e. delivered to the retailer.

U.S. Pat. No. 4,453,874 shows a device of the above-described type, with a grabber having a front, free end on which rotatable rollers are mounted. The rollers serve to lift the goods to be taken on one side by means of frictionally engaged contact with a side surface of said goods, such that they can be loaded onto a support base of the grabber that can be moved under the goods for this. Alternatively, a conveyer belt can be provided at the grabber, with which the goods can be transported on said grabber. The rollers can be provided with a friction-increasing relief or a coating; for example, they can be fashioned rubberized. The taken goods package can subsequently be deposited again on another pallet in the reverse order. Such grabbers are generally permanently installed in a system or are mobile, directed via a portal system.

It is disadvantageous that only one single-sided action on the goods is possible, such that a brace is necessary and—since the goods are tilted upon lifting and the distance between brace and lifting roller increases—either the brace or the lifting roller must be elastically arranged, wherein a difficult coordination is to be conducted between elastic yielding force and friction coefficient of the roller.

DE 37 18 601 A1 discloses a depalletizing tool that is mounted on an articulated robot. The tool possesses rigid, blade-like pickup tongues that can engage below and lift the goods packages. United States Patent Application Publication No. 2002/0154986 A1 discloses a lifting plate with very low height that can be slid between layers of goods, thereby raises the upper layer so that a stronger and more stable take-up plate can be slid under the goods package. This tool can also be attached to a robot.

Depalletizing tools known from the prior art also exhibit the disadvantage that the depalletizing process can be sensitively disrupted or, respectively, hindered by a presence of loose objects arranged on the top of a container unit (for example coverings or cover layers in the most varied embodiments or materials). For example, a sliding or canting of such objects during an unloading process can lead to a complete operational failure of a of a known depalletizing tool, with a significant time and repair cost associated therewith.

SUMMARY OF THE INVENTION

An object of the present invention is to reliably and safely depalletize products in the most varied packaging forms, starting from the aforementioned prior art while avoiding the cited disadvantages.

According to the invention, this object is achieved in a method of the aforementioned type wherein the containers are lifted on two opposite sides. Accordingly, a device according to the species provides at least two opposite rollers to achieve the cited object.

In accordance with the invention, a safe and reliable lifting of containers stacked for removal is enabled in that the containers are attacked in a frictionally engaged manner on at least two opposite sides. The containers are lifted in alignment parallel to the container layers (in particular vertically) and a higher reliability is achieved because two opposite sides are attacked in a frictionally engaged manner. Moreover, a difficult coordination between friction coefficient of the lifting elements (such as flat rollers and horizontals of this yielding or elastic force pressing against the containers) is avoided relative to the aforementioned prior art since the lifting elements can be pressed against the containers with a force that can be maximized, but that does not damage the containers.

According to a preferred development of the method according to the invention, the containers are lifted by rollers that rotate for this purpose, wherein in particular the—lifted—containers are underridden with a respective support base part from at least two sides. The underriding in particular ensues from two opposite sides.

Accordingly, in an embodiment of the device according to the invention the support base has at least two support base parts that can be moved against one another. A symmetrical embodiment of the device according to the invention is hereby achieved. Unloading thus does not excessively occur on one side. Moreover, the pick-up and gripping of the containers is hereby likewise improved and provided with greater safety. While (in principle) two support base parts (thus two support base halves) that can be moved against one another can be provided, four support base parts can also be provided that are fashioned in triangle or tongue shapes, wherein two respectively move perpendicular to the other two.

In further embodiments of the device according to the invention the rollers can be driven by at least one roller drive motor. In particular the rollers can be driven via belts from at least one roller motor.

To move the plates, in a preferred embodiment it can be provided that the support base parts can be shifted via carriers, wherein in particular the support base parts can be shifted again by means of drive belts (if necessary via the carriers). In an embodiment the base parts can be shifted via at least one distributor shaft, and the distributor shaft can furthermore be driven by at least one motor via at least one synchronous belt.

In order to also take up the containers in a direction perpendicular to the stops, in a preferred embodiment a centering device is provided that can be designed with at least one slider plate that can be shifted parallel to the extension direction of two rollers, in order to center the containers, wherein furthermore two slider plates that can be displaced against one another can be provided. A concrete embodiment thereby provides that the slider plates can be shifted via at least one centering motor (advantageously via synchronous belts), wherein in particular the slider plates can be moved synchronously. In a preferred manner, the device according to the invention has a connection coupling for connection with a robot, as this is known from the prior art.

In order to furthermore achieve an increased operating safety during the depalletizing process, it is proposed that at least one hold-down clamp acts on the top of the container. According to the invention, slipping or canting of objects arranged on the top of the container unit but not fixed to said container unit can thereby be reliably prevented. These can be loosely positioned covers or liners in different embodiments or materials, as are typically arranged on the surface of containers for protective purposes.

In regards to a device, to solve this problem the invention provides that a hold-down clamp is arranged on the top of the container. Such a hold-down clamp is preferably fashioned essentially in the shape of a plate. This allows the hold-down clamp to cover the entire top side of a container, but it remains simple to position.

In a preferred embodiment, such a hold-down clamp us furthermore fashioned to be flexible, such that it can essentially be adapted to the surface shape of the container. A particularly high degree of operating safety can thus also be achieved in the case of individual objects arranged on specific sub-regions of the surface since, according to the invention, a securing essentially along the entire container top is thus ensured. For example, the hold-down clamp can be formed from a chain-shaped material, in particular flat-top chains made from plastic or metal. The hold-down clamp can likewise be formed from rug-shaped, plaited material, in particular wire or fabric. Such a material choice according to the invention enables an adaptation of the hold-down clamp to the respective contours of a respective container layer.

Alternatively, the hold-down clamp can also be fashioned to be rigid. A particularly high contact pressure force of the hold-down clamp on the surface of the container can thus be achieved. Additional embodiments of the hold-down clamp provide an even-surfaced or slack design.

To achieve a particularly simple positioning of the hold-down clamp, the hold-down clamp can be moved vertically from an upper position into a lower position. The lower position preferably corresponds to that position in which the hold-down clamp comes into frictionally engaged contact with the surface of the container top. A use of the hold-down clamp as necessary is also possible. If the hold-down clamp should not be necessary, it remains in its upper position upon implementation of the method according to the invention.

In a preferred embodiment, the hold-down clamp can travel continuously; in particular the travel height or, respectively, width can be continuously adjusted. The hold-down clamp is thereby preferably guided by linear units, whereby a precise movement is enabled as necessary. In particular, it can be provided that the linear direction of the hold-down clamp ensues at its respective sides or, respectively, corners, in particular on four sides. A precise, switchable embodiment of a hold-down clamp thereby provides that this can move in a pneumatic and/or motorized manner.

DESCRIPTION OF THE PREFERRED EMBODIMENTS

Figure 1:
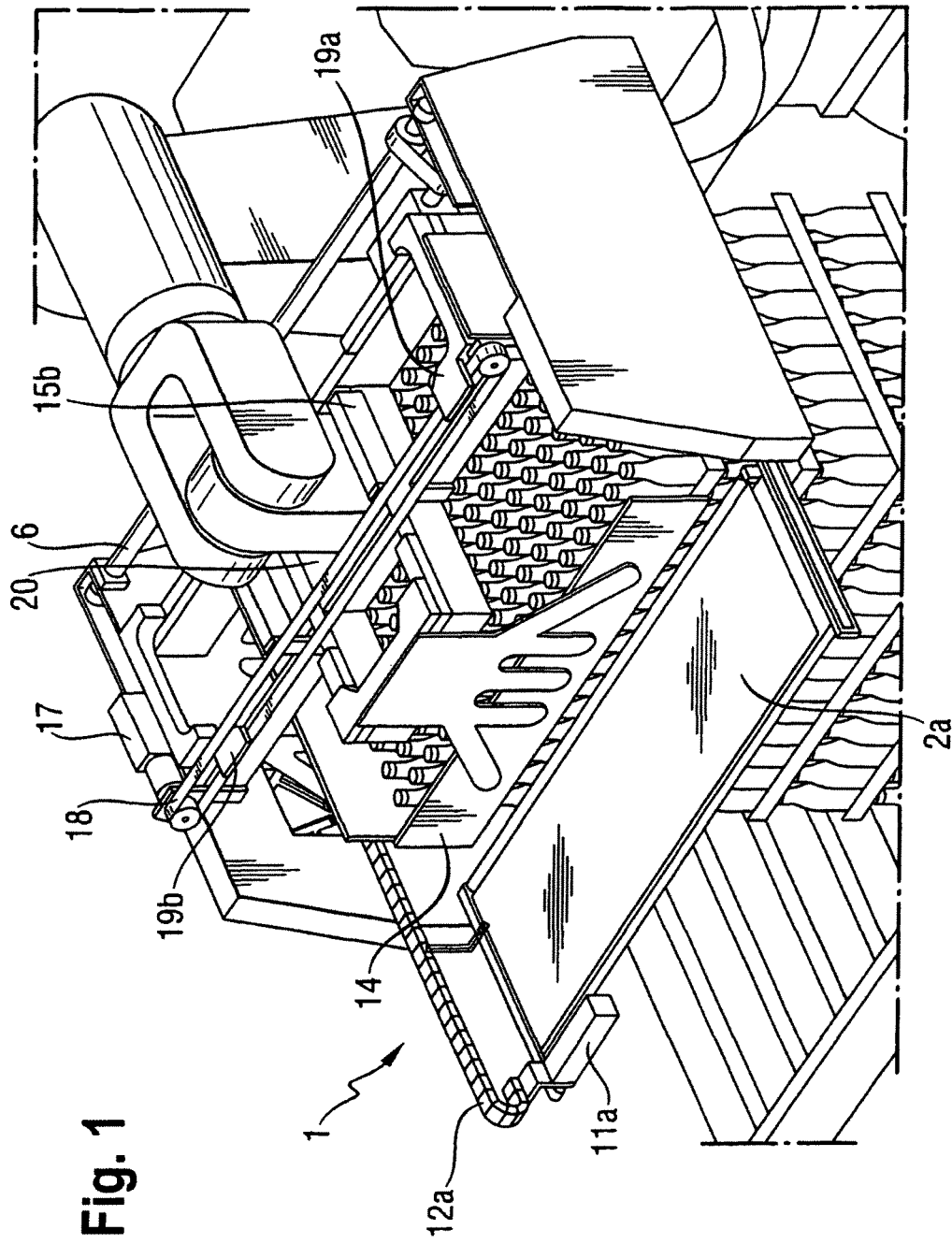
FIG. 1 is a perspective view of a device according to the invention, showing a robot attacking a container stack.
Figure 2:
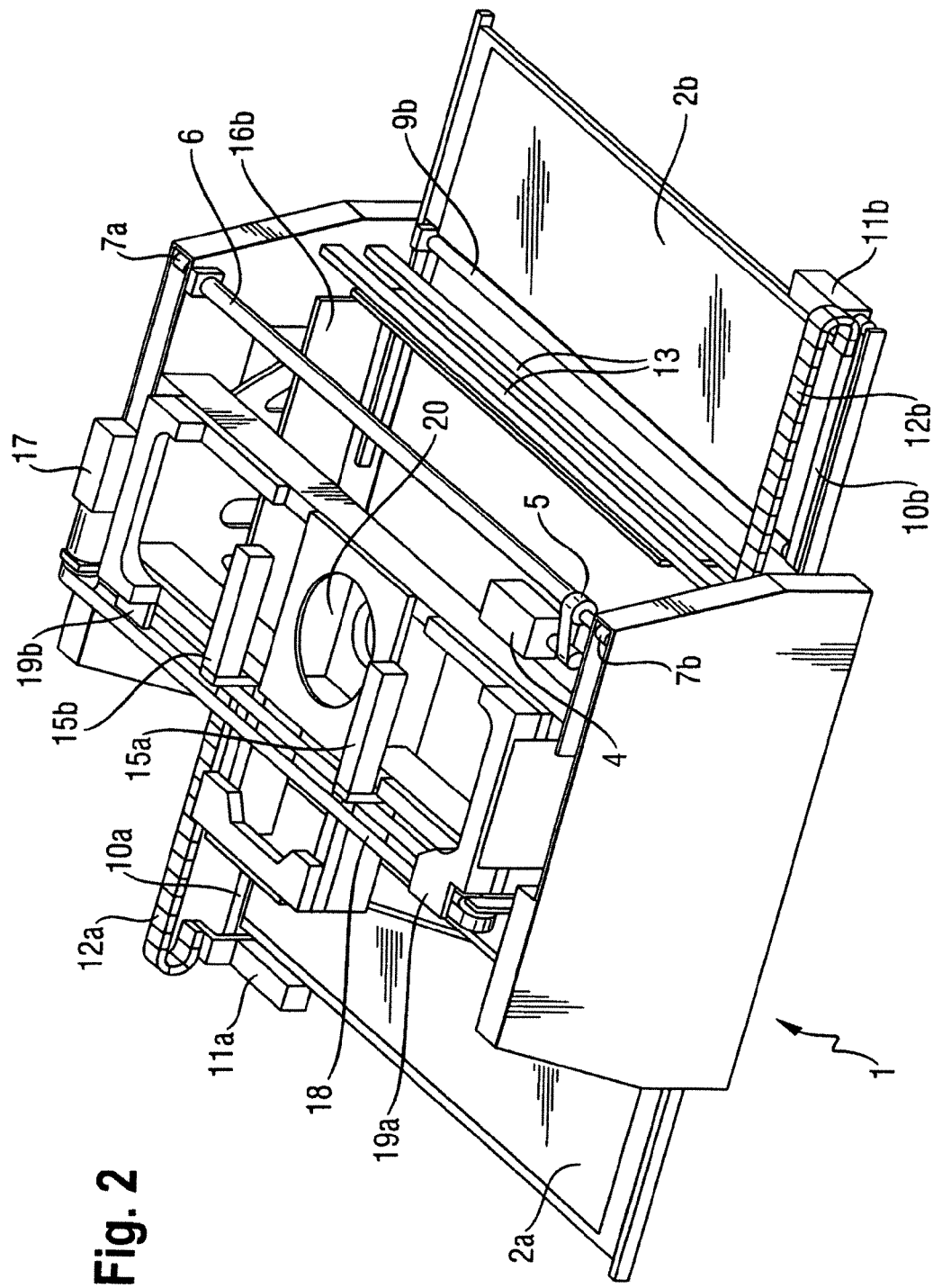
FIG. 2 illustrates a preferred embodiment of the device according to the invention, in a perspective view from above.
Figure 3:
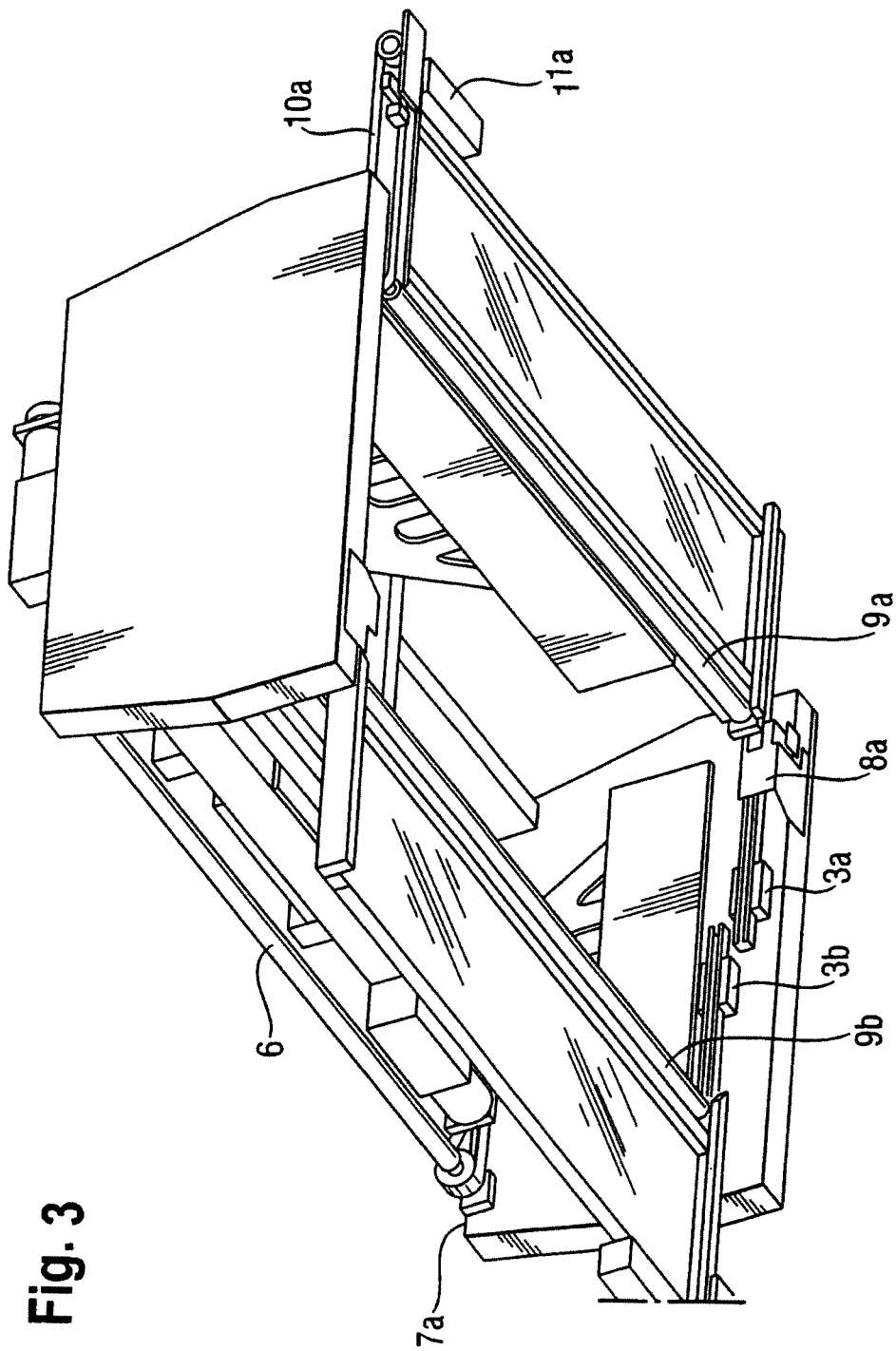
FIG. 3 shows an embodiment of the invention in a perspective view from below, in the open state.
Figure 4:
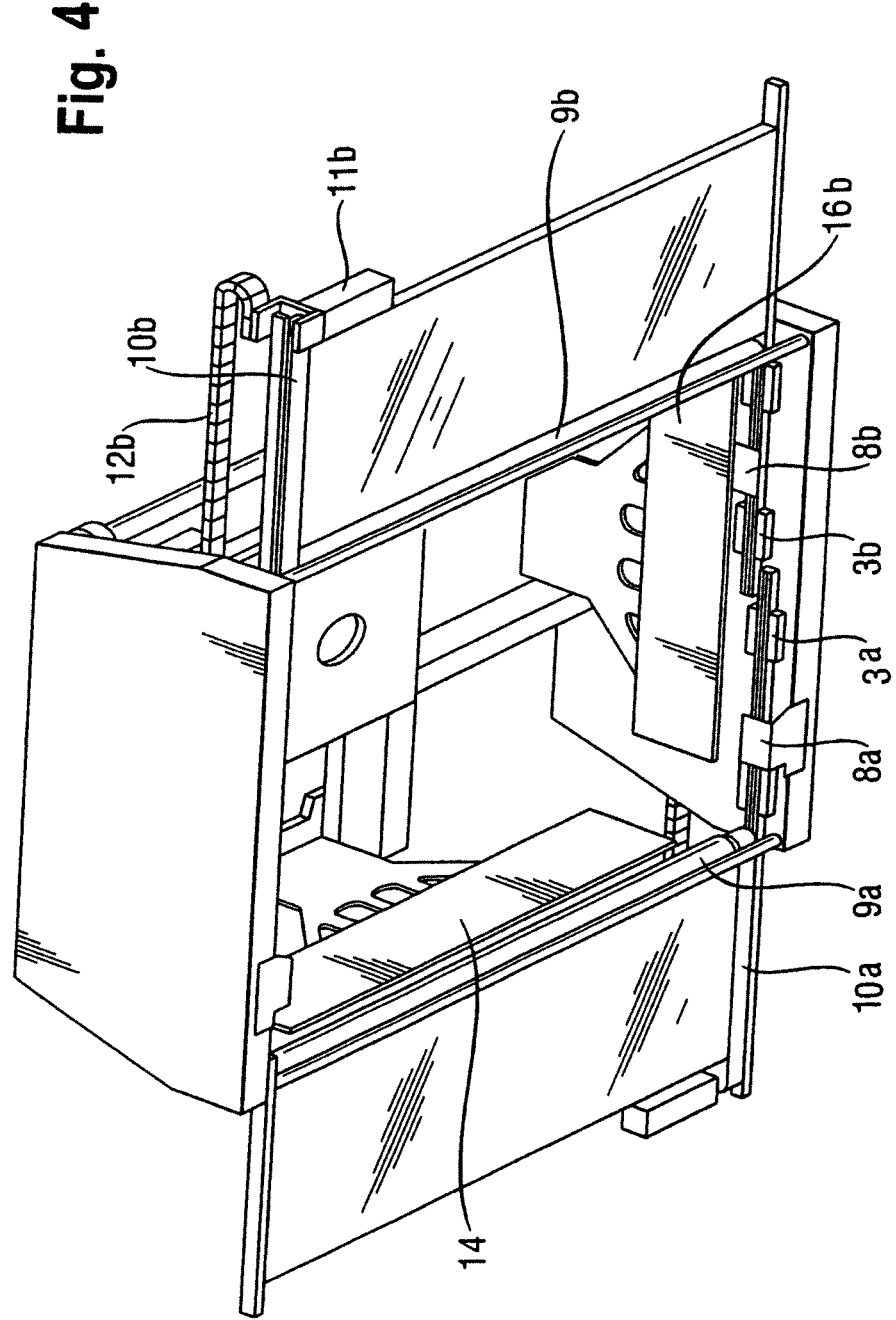
FIG. 4 is a further perspective view of the device according to the invention in the open state.

FIG. 1 is an overview representation in which a device according for depalletizing according to the invention is connected with a robot that encompasses the uppermost layer of a container stack located on a pallet in order to lift this from the remaining stack.

The device for depalletizing according to the invention is described in detail in the following using additional Figures.

The depalletizing tool according to the invention possesses a base frame 1 on whose underside two support base parts 2a and 2b (here as support base halves) can be moved towards and away from one another by means of slide bearings 3a, 3b. For an automatic movement of the support base parts 2a and 2b, a common electrically drivable motor 4 is provided that drives (via a first synchronous belt 5) a distributor shaft 6 which drives a right drive belt 7a and a left drive belt 7b. The drive belts 7a and 7b are for their part connected with a carrier 8a and 8b that are in turn respectively connected with one of the two support base parts 2a and 2b. However, the support base parts 2a and 2b could also be moved independent of one another if two motors controllable independent of one another were provided, which, however, is not the case in the realized embodiment. A roller 9a and 9b are respectively rotatably borne on the inner, facing longitudinal edges of the support base parts 2a and 2b. Such rollers can, for example, be realized in the form of rotating, rubberized rollers via which a frictionally engaged force transfer is enabled. Each roller 9a, 9b is connected via an additional belt 10a and 10b with an associated roller drive motor 11a and 11b. The shaft drive motors 11a and 11b are connected with a drive controller (not shown) via electrical lines that are directed with low wear within power track chains 12a and 12b.

A fixed stop is designated with the position number 13, against which stop the depalletized goods are shifted together by a movable stop 14, counter to the movement direction of the support base parts 2a and 2b. The movable stop 14 is moved by means of two cylinders 15a and 15b charged with pressurizing medium. The cylinders 15a and 15b are executed as compressed air cylinders that can be charged with compressed air via electrically activatable valves (not shown).

The collected goods can be centered at a right angle to the movement direction of the support base parts 2a and 2b and perpendicular to the first centering direction by means of an additional centering device that possess two opposite, movable slide plates 16a and 16b. The slide plates 16a and 16b are moved jointly and in sync by means of a centering motor 17 that is coupled with an additional synchronous belt 18 that for its part are connected with two connection parts 19a and 19b. One connection part 19a and 19b is respectively, permanently connected with one of the slide plates 16a and 16b so that the two slide plates 16a and 16b are synchronously moved towards or away from one another (depending on the rotation direction of the centering motor 17) upon driving the synchronous belt 18.

The surfaces of the support base parts 2a and 2b are produced from gliding stainless steel plates. The stainless steel plates are stamped or deformed with knobs or ridges to reduce the contact surface with the arranged goods. Alternatively, the surfaces of the support base parts 2a and 2b can also be equipped with actively drivable conveyor belts or with passive track rollers.

For a positioning of the depalletizing tool at the exact height on a plane between two layers of goods or goods containers, light barriers are provided as sensors that can detect not only the boundary plane between two goods layers but also an interstice between two goods or goods containers in the movement direction of the support base parts 2a and 2b in the same plane. For this purpose, the sensors for detection of the interstice between two goods or goods containers can be arranged at the forward end of the support base parts 2a and 2b, i.e. in proximity to the rollers 9a, 9b. Either these sensors can additionally detect the height of the layer, or separate sensors can be provided for this that, for example, are attached to the base frame 1 of the depalletizing tool.

A connection of the device according to the invention with a robot is possible via a connection coupling 20 arranged on the top side.

Figure 5:
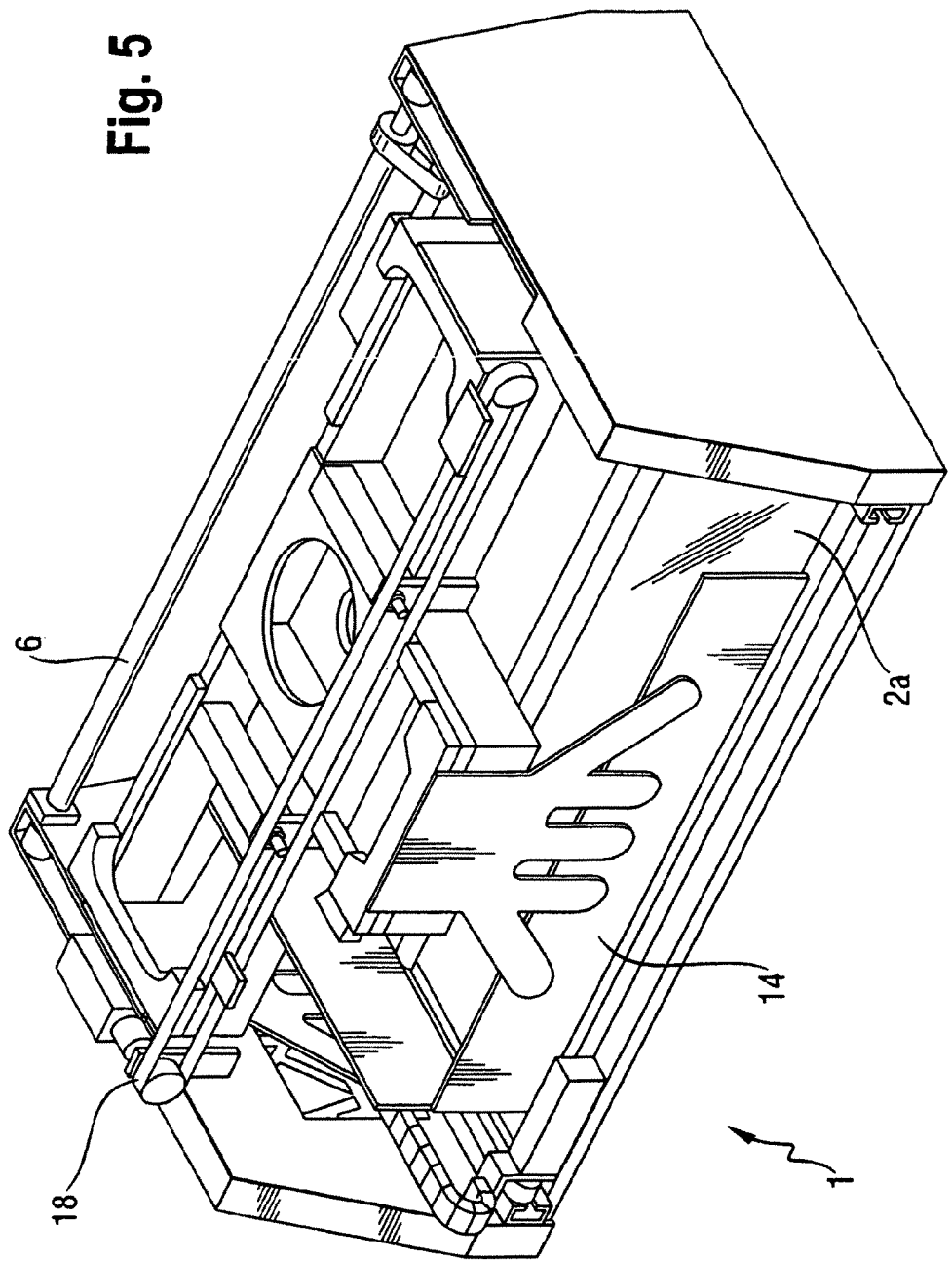
FIG. 5 is a perspective view of a preferred embodiment of the device according to the invention in a closed state, from above.
Figure 6:
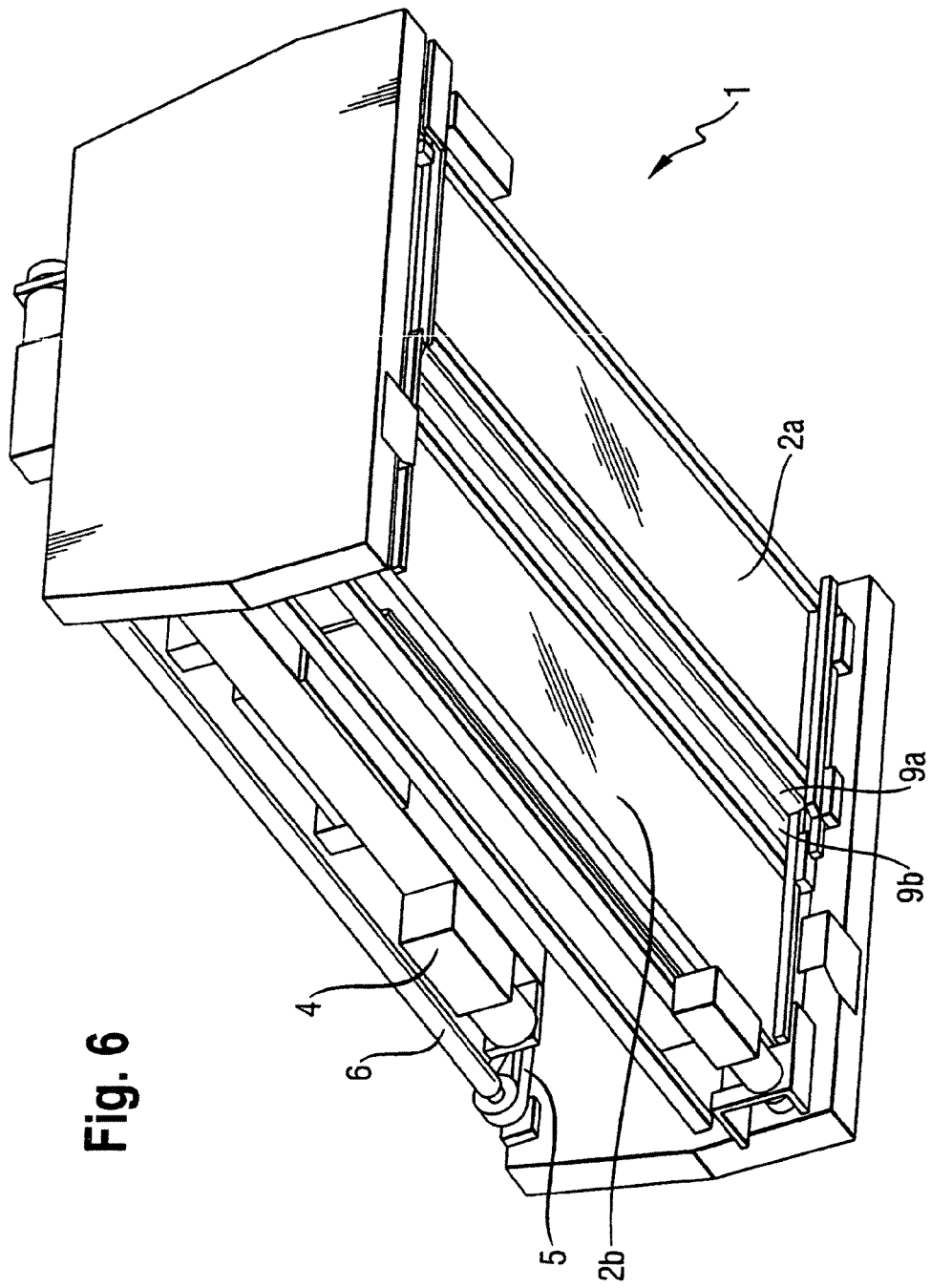
FIG. 6 is a further perspective view of the device according to the invention in the closed state, from below.
Figure 7:
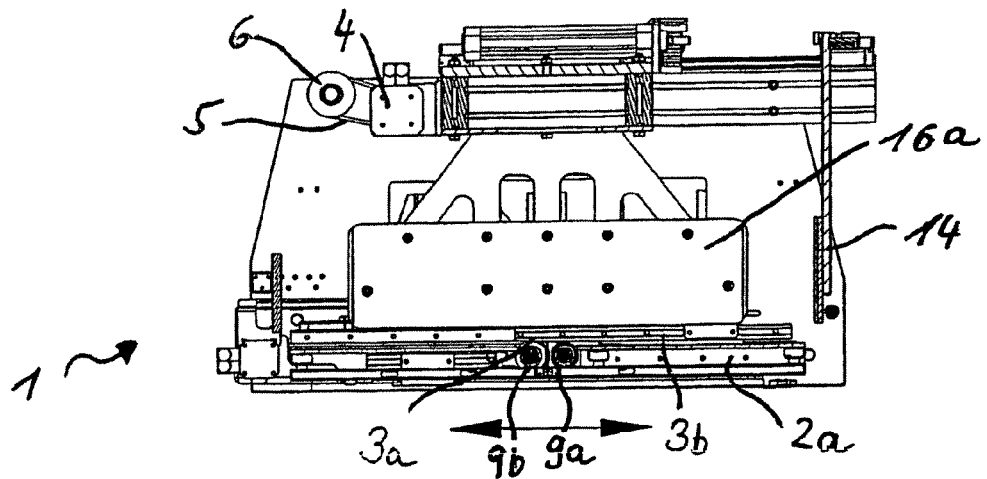
FIG. 7 is a vertical section through the device according to the invention in a closed state.
Figure 8:
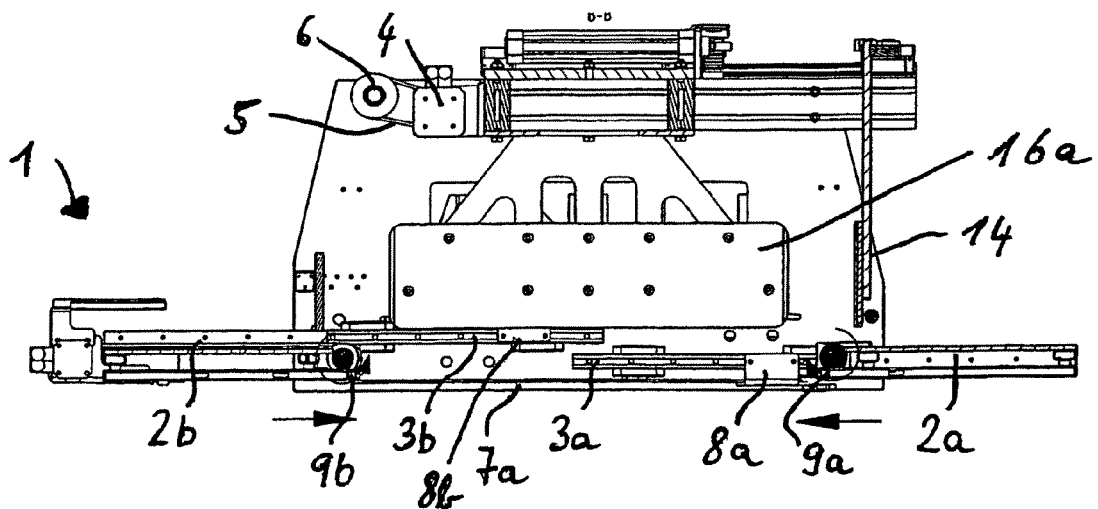
FIG. 8 is a vertical section through the device according to the invention in an open state.

To pick up the uppermost container of a container stack (as this is presented in FIG. 1), the robot bearing the device according to the invention lowers said device over the stack so that the rollers 9a, 9b come to lie in the lower region of the uppermost layer or of the upper container. They are then moved against the container together with the support base parts 2a, 2b. They are subsequently connected in the opposite direction and non-positively lift the container until this arrives with its lower edge in the upper region of the rollers 9a, 9b, whereupon these can travel under the container together with the support base parts as this is presented in FIGS. 5, 6 and 7. After the support base parts 2a, 2b have reliably engaged below the container, the robot can lift this from the stack (by means of the device 1 according to the invention that is connected with said robot) and move the container to a depositing location.

Figure 9:
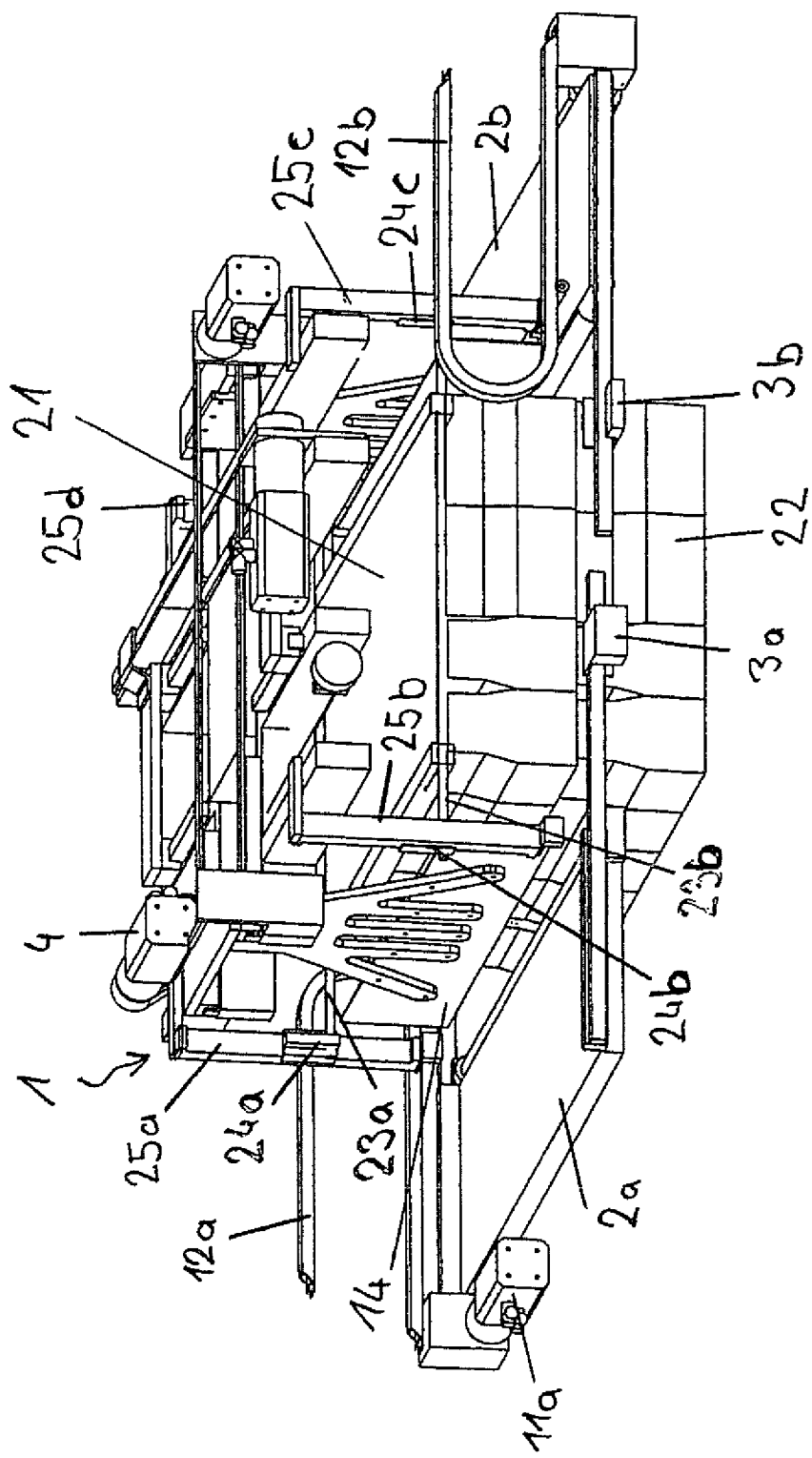
FIG. 9 is a perspective view of the device according to the invention in a side view, wherein components of the base frame are removed so that an internal area with the hold-down clamp according to the invention is visible, the hold-down clamp covering the surface of a container stack.
Figure 10:
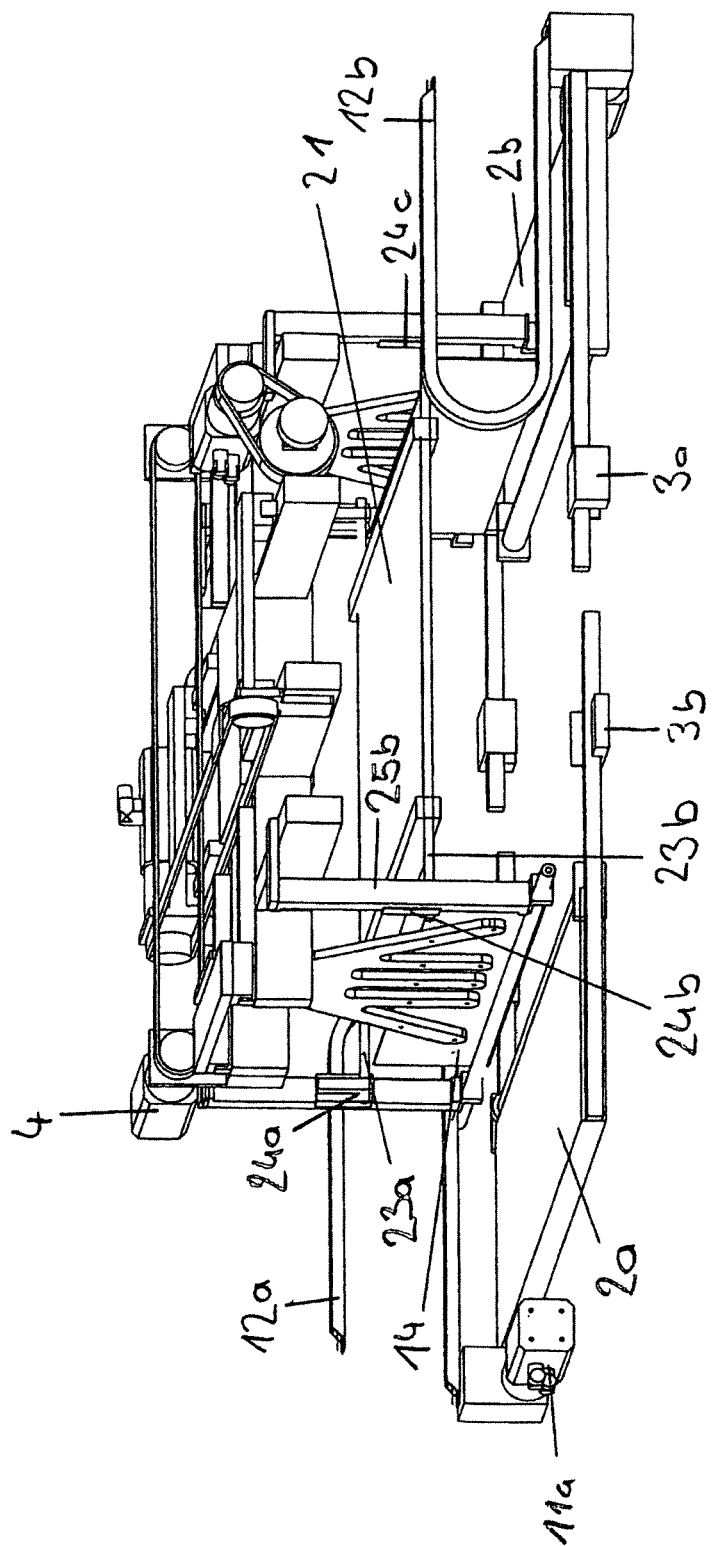
FIG. 10 is a side view of the device of the invention corresponding to FIG. 9, without the container stack protruding into the internal space.
Figure 11:
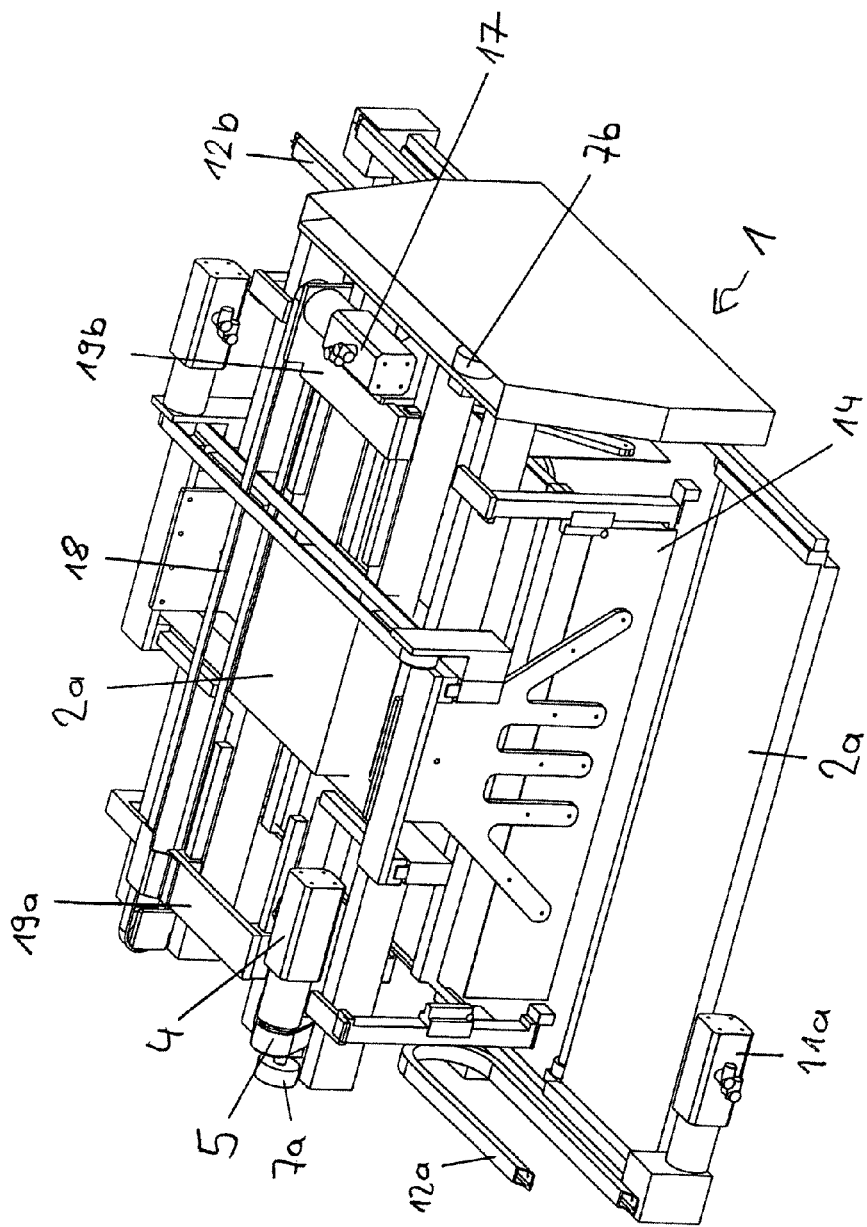
FIG. 11 is a further perspective view of the device according to the invention, from above.

In the perspective view (shown in FIG. 9) of a device according to the invention, side parts of the base frame 1 are not shown so that the internal area is visible. The support base parts 2a, 2b are thereby located in a position wherein they are moved outward, away from one another, so that the accommodation of a container stack 22 is possible, which container stack 22 protrudes into the internal space of the device.

A plate-shaped hold-down clamp 21 is arranged on the top side of the connection stack 22, which hold-down clamp 21 is flexibly adapted to the surface of the container and via which a slipping or canting of objects (such as covers or liners) loosely positioned on the top side can be reliably avoided. The hold-down clamp 21 possesses a rectangular shape that essentially corresponds to the area that is formed by the support base parts 2a, 2b when they are moved together. A complete covering of the top side of the respectively picked-up container layer is thus possible.

A respective retention clip 23a, 23b, 23c, 23d via which the hold-down clamp 21 is respectively coupled to one of four linear guides 25a, 25b, 25c, 25d by means of a fastener 24a, 24b, 24c, 24d is located at the four corners of said hold-down clamp 21. The linear guides 25a, 25b, 25c, 25d are essentially formed by rails arranged at the respective side edges of the device according to the invention and extending perpendicular to the surface of the hold-down clamp. A continuous, electrically or pneumatically driven lowering or, respectively, raising of the hold-down clamp 21 onto or, respectively, from the top of the container stack is thus possible. The use of the hold-down clamp 21 can thereby ensue as necessary. For example, a lowering of the hold-down clamp 21 onto the top side of the container stack 22 can be provided only in the event that loose material is present by which the loading or, respectively, unloading process could be affected or disrupted.

Under the assumption that the hold-down clamp is required in a loading or, respectively, unloading process, the device according to the invention is positioned above the uppermost container layer. A lowering of the hold-down clamp 21 onto the top side of the container unit 22 ensues in the next step. In the following step, a raising of the uppermost container layer ensues via the rollers 9a, 9b in the manner described in the preceding, such it is possible for the support base parts 2a, 2b to move under the container. During this step, loosely positioned objects (such as covers or liners) are fixed or, respectively, held in position by the hold-down clamp positioned on the top.

In the following step, a pick-up of the layer in the device according to the invention is brought about by the robot, which in turn produces a repositioning of said layer, for example to another pallet or a subtraction table. The hold-down clamp also remains in position on the top side of the container layer during the step of the release of said container layer, and only travels back into its upper, starting position again after the release process of the container layer.

Although modifications and changes may be suggested by those skilled in the art, it is the intention of the inventors to embody within the patent warranted heron all changes and modifications as reasonably and properly come within the scope of their contribution to the art.

We claim as our invention:

1. A method for depalletizing stacked containers located one above another in a stack, comprising the steps of:
    moving an assembly over at least an uppermost container in said stack, said assembly comprising two movable support base members each having a leading edge at which a roller is mounted, said support base members being initially positioned to form an open space between the respective rollers;
    positioning said assembly relative to the uppermost container to cause the uppermost container to be located in said open space while frictionally engaging opposite sides of said uppermost container with the respective rollers;
    repositioning said assembly to bring said rollers beneath said uppermost container and closing said support base members beneath said uppermost container while said uppermost container rides on said rollers, to bring said leading edges of said support base members toward each other to produce a support base beneath said uppermost container; and
    lifting said uppermost container off of said stack on said opposite sides thereof with said support base beneath said uppermost container.

2. A method as claimed in claim 1 comprising covering the stacked containers with at least one hold-down clamp acting on a top of the stacked containers.

3. A device for depalletizing stacked containers located one above another in stack, said device comprising:
- an assembly comprising two movable support base members each having a leading edge at which a roller is mounted, said support base members being initially positioned to form an open space between the respective rollers;
- a positioner that positions said assembly relative to the uppermost container to cause the uppermost container to be located in said open space while frictionally engaging opposite sides of said uppermost container with the respective rollers;
- said positioner repositioning and operating said assembly to bring said rollers beneath said uppermost container and closing said support base members beneath said uppermost container while said uppermost container rides on said rollers, to bring said leading edges of said support base members toward each other to produce a support base beneath said uppermost container; and
- said position then lifting said uppermost container off of said stack on said opposite sides thereof with said support base beneath said uppermost container.

4. A device as claimed in claim 3 comprising at least one drive motor that drives said rollers.

5. A device as claimed in claim 4 comprising drive belts connecting said rollers to said at least one drive motor, said drive motor driving said rollers via said drive belts.

6. A device as claimed in claim 3 comprising carriers connected to said support base parts to respectively move said support base parts.

7. A device as claimed in claim 6 comprising drive belts connected between said support base parts and said carriers to displace said support base parts relative to each other.

8. A device as claimed in claim 3 comprising at least one distributor shaft connected to said support base parts to displace said support base parts.

9. A device as claimed in claim 8 comprising at least one motor connected to said distributor shaft that drives said distributor shaft via at least one synchronous belt.

10. A device as claimed in claim 3 comprising a fixed stop and a movable stop that is movable relative to said fixed stop, for positioning said stacked containers.

11. A device as claimed in claim 10 comprising a cylinder connected to said movable stop that selectively displaces said movable stop.

12. A device as claimed in claim 3 comprising at least one slider plate that is displaceable parallel to a direction of movement of said rollers, to center said stacked containers.

13. A device as claimed in claim 3 comprising two slide plates that are displaceable relative to each other to respectively move said support base parts relative to each other.

14. A device as claimed in claim 13 comprising a motor connected to said slide plates via respective synchronous belts that displaces said slide plates to center said slide plates relative to each other.

15. A device as claimed in claim 14 wherein said motor operates said slide plates synchronously via said synchronous belts.

16. A device as claimed in claim 3 comprising a robot and a connection coupling connecting said lifting device to said robot.

17. A device as claimed in claim 3 comprising a hold-down clamp at a top of said stacked containers.

18. A device as claimed in claim 17 wherein said hold-down clamp has a plate-shape.

19. A device as claimed in claim 17 wherein said hold-down clamp is comprised of flexible material to allow said hold-down clamp to conform to a surface shape of the tope of said stacked containers.

20. A device as claimed in claim 17 wherein said hold-down clamp is formed of rigid material.

21. A device as claimed in claim 17 wherein said hold-down clamp is mounted for vertical movement between an upper position and a lower position relative to the top of said stacked containers.

22. A device as claimed in claim 21 wherein said hold-down clamp is mounted for continuous movement between said upper position and said lower position.

23. A device as claimed in claim 21 wherein said lower position coincides with a surface of the top of said stacked containers.

24. A device as claimed in claim 21 comprising a displacement device connected to said hold-down clamp that moves said hold-down clamp between said upper position and said lower position, said displacement device being selected from the group consisting of a motor and a pneumatic displacement device.

25. A device as claimed in claim 17 wherein said hold-down clamp has dimensions allowing said hold-down clamp to cover an entirety of the top of said stack of containers.

* * * * *